(12) United States Patent
D'Urso et al.

(10) Patent No.: US 9,926,027 B2
(45) Date of Patent: Mar. 27, 2018

(54) METHOD FOR PRODUCING A BUS

(71) Applicant: DUR-A-BUS COACH BUILDERS LTD., Toronto (CA)

(72) Inventors: Lorenzo D'Urso, Toronto (CA); Joseph D'Urso, Toronto (CA); Michael Pilca, Toronto (CA)

(73) Assignee: DUR-A-BUS COACH BUILDERS LTD., Toronto (CA)

( * ) Notice: Subject to any disclaimer, the term of this patent is extended or adjusted under 35 U.S.C. 154(b) by 304 days.

(21) Appl. No.: 14/943,819

(22) Filed: Nov. 17, 2015

(65) Prior Publication Data

US 2017/0137079 A1   May 18, 2017

(51) Int. Cl.
| | | |
|---|---|---|
| *B60P 3/42* | (2006.01) | |
| *B62D 65/00* | (2006.01) | |
| *B62D 31/02* | (2006.01) | |
| *B62D 65/06* | (2006.01) | |

(52) U.S. Cl.
CPC ............ *B62D 65/00* (2013.01); *B60P 3/42* (2013.01); *B60P 3/423* (2013.01); *B62D 31/02* (2013.01); *B62D 65/06* (2013.01)

(58) Field of Classification Search
CPC ...... B62D 65/00; B62D 65/02; B62D 65/024; B62D 65/04; B60P 3/42; B60P 3/423
See application file for complete search history.

(56) References Cited

U.S. PATENT DOCUMENTS

| | | |
|---|---|---|
| 4,231,144 A * | 11/1980 | Bernacchia, Jr. ....... B60P 3/423 29/401.1 |
| D356,057 S | 3/1995 | Sacco et al. |
| 5,492,386 A | 2/1996 | Callum |
| 5,529,378 A | 6/1996 | Chaban et al. |
| 5,788,329 A | 8/1998 | Pilarczyk et al. |
| D550,122 S | 9/2007 | Pfeiffer |
| D633,824 S | 3/2011 | Fukui et al. |
| D666,527 S | 9/2012 | Li et al. |
| D670,199 S | 11/2012 | Zhang et al. |
| D678,822 S | 3/2013 | Armigliato et al. |
| 8,585,116 B2 | 11/2013 | King |
| D696,156 S | 12/2013 | Campbell et al. |
| 8,702,145 B2 | 4/2014 | Cao et al. |
| 8,770,646 B2 | 7/2014 | Line et al. |
| 8,899,654 B2 | 12/2014 | Ellsworth et al. |
| D732,431 S | 6/2015 | Loeb |
| 2011/0084521 A1 | 4/2011 | Shellenberger et al. |
| 2011/0121603 A1 | 5/2011 | Blatseas et al. |
| 2011/0148134 A1 | 6/2011 | Gerhardt et al. |

(Continued)

OTHER PUBLICATIONS

DUR-A-BUS Brochure, Ontario Transportation Expo, Apr. 12-15, 2013, Toronto, ON. BusCon Expo, Sep. 10-13, 2013, Chicago, IL. pp. 1-2.

*Primary Examiner* — Christopher Besler (74) *Attorney, Agent, or Firm* — Lando & Anastasi, LLP (57) ABSTRACT

The method is for producing a bus using a cutaway van chassis, the bus being of the type having a sliding passenger door and the chassis being of the type having a passenger door frame including a horizontal rail, an A-pillar extending to the rail and a B pillar extending to the rail, the A-pillar being adapted to receive a swinging door. In the method, the B-pillar and the rail are removed to produce a modified chassis and the remainder of the bus is constructed about the modified chassis.

3 Claims, 14 Drawing Sheets

(56) References Cited

U.S. PATENT DOCUMENTS

2013/0320654 A1 12/2013 Clark et al.
2014/0346758 A1 11/2014 Mueller et al.
2015/0130172 A1 5/2015 Mueller et al.

* cited by examiner

METHOD FOR PRODUCING A BUS

FIELD OF THE INVENTION

The invention relates to the field of bus construction.

BACKGROUND OF THE INVENTION

It is known to build a bus using a body-on-frame construction. Integral bus manufacture is also known, wherein no underframe is used.

SUMMARY OF THE INVENTION

Forming one aspect of the invention is a method for producing a bus using a cutaway van chassis, the bus being of the type having a sliding passenger door and the chassis being of the type having a passenger door frame including a horizontal rail, an A-pillar extending to the rail and a B pillar extending to the rail, the A-pillar being adapted to receive a swinging door.

The method comprises the steps of: (i) removing the B-pillar and the rail to produce a modified chassis; and (ii) constructing the remainder of the bus about the modified chassis.

According to another aspect of the invention, the remainder of the bus can include a horizontal rail which is welded to the A-pillar.

According to another aspect of the invention, the remainder of the bus can include a bed which is mounted to the chassis.

According to another aspect of the invention, the remainder of the bus can include a swinging door disposed on one side of the bus, forward of the rear wheels and rearward of the sliding passenger door, the swinging door being adapted to swing, exteriorly of the bus, 180°.

Further advantages and characteristics of the invention will become apparent upon review of the following detailed description and the appended drawings, the latter being briefly described hereinafter.

DETAILED DESCRIPTION

An exemplary embodiment of the invention is hereinafter described with reference to the drawings and will be understood to be a method utilizing a cutaway van chassis 30 of the type shown in FIGS. 1 and 2 having a passenger door frame 32 including a horizontal rail 34, an A-pillar 36 extending to the rail 34 and a B pillar 38 extending to the rail 34, the A-pillar 36 being adapted to receive a swinging door. The prior art chassis 30 in FIG. 1 and FIG. 2 will be understood to be exemplary, only, and to form no part of the invention.

Figure 3:
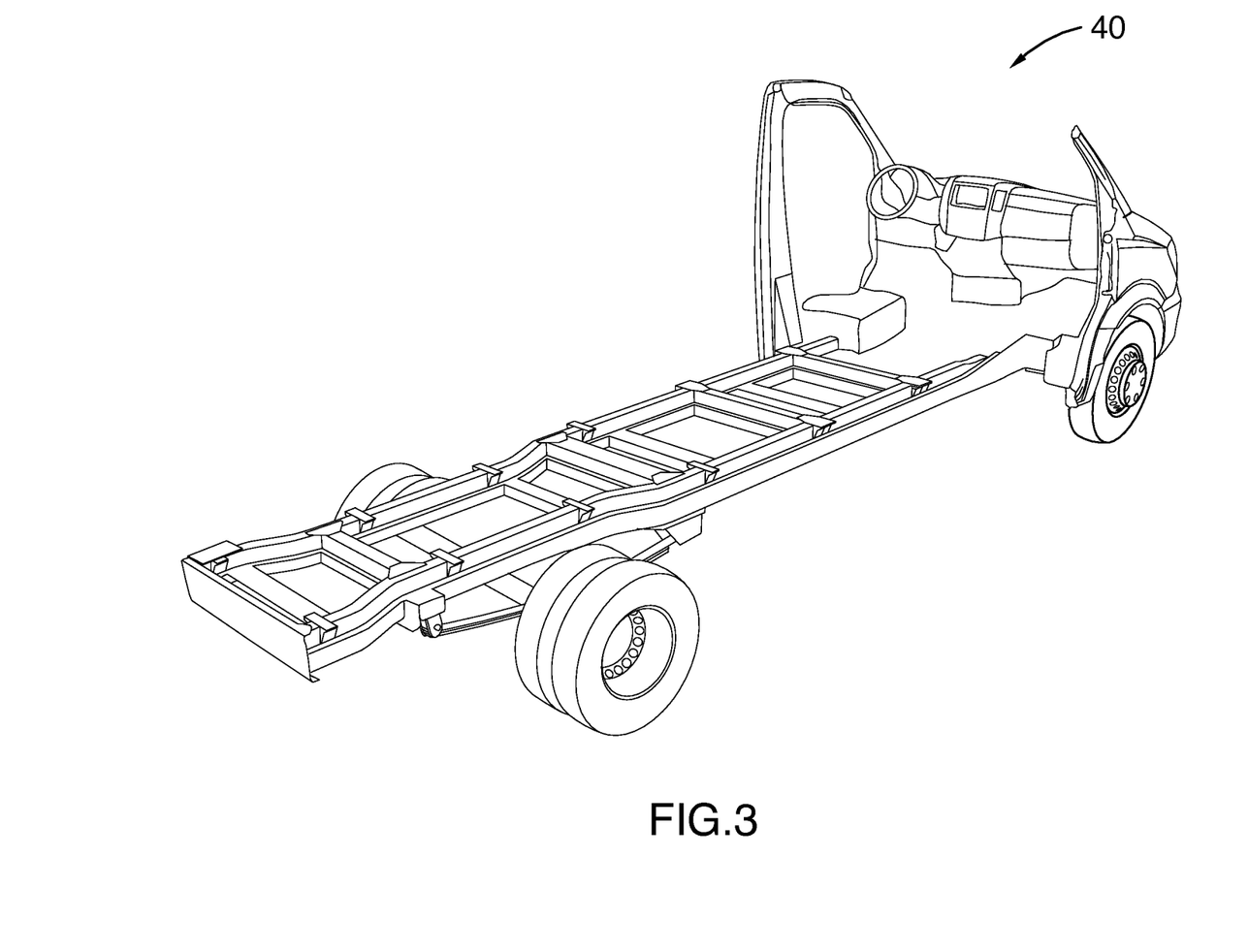
FIG. 3 is a rear, right side view of the structure of FIGS. 1 and 2, with the B-pillar and the rail of the passenger door frame removed.
Figure 4:
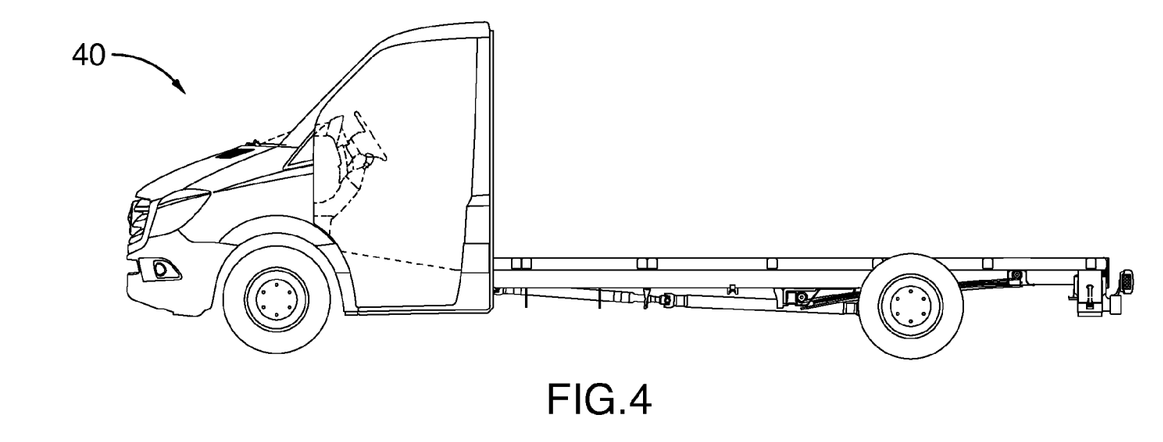
FIG. 4 is a left side view of the structure of FIG. 3.
Figure 5:
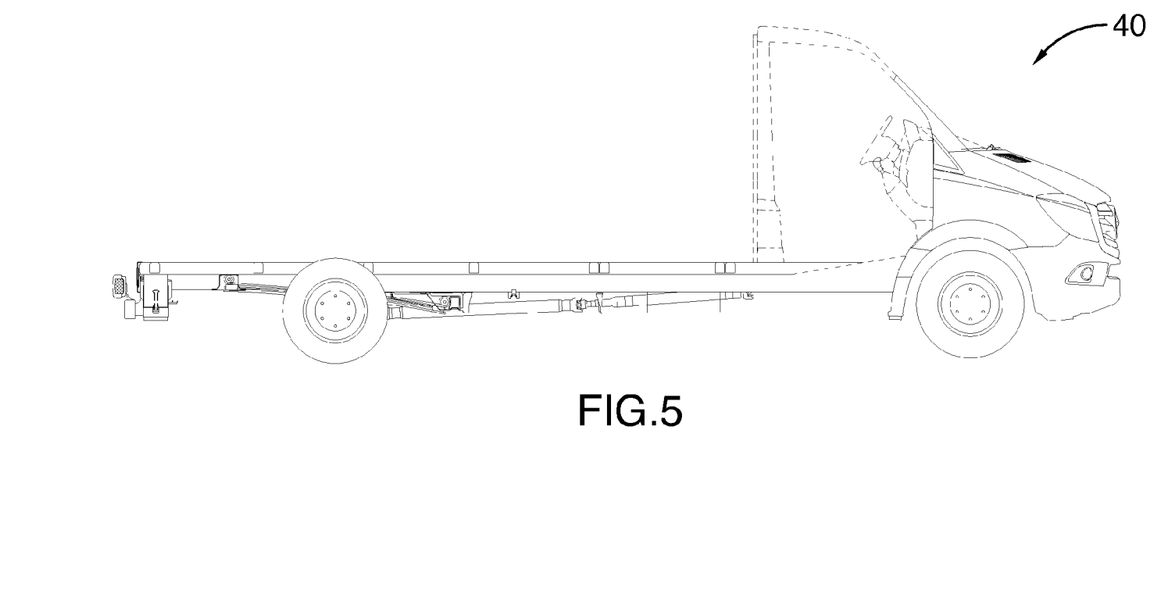
FIG. 5 is a right side view of the structure of FIG. 3.

An initial step of the method involves removing the B-pillar 38 and the rail 34 to produce a modified chassis 40 as shown in FIG. 3, FIG. 4 and FIG. 5.

Figure 6:
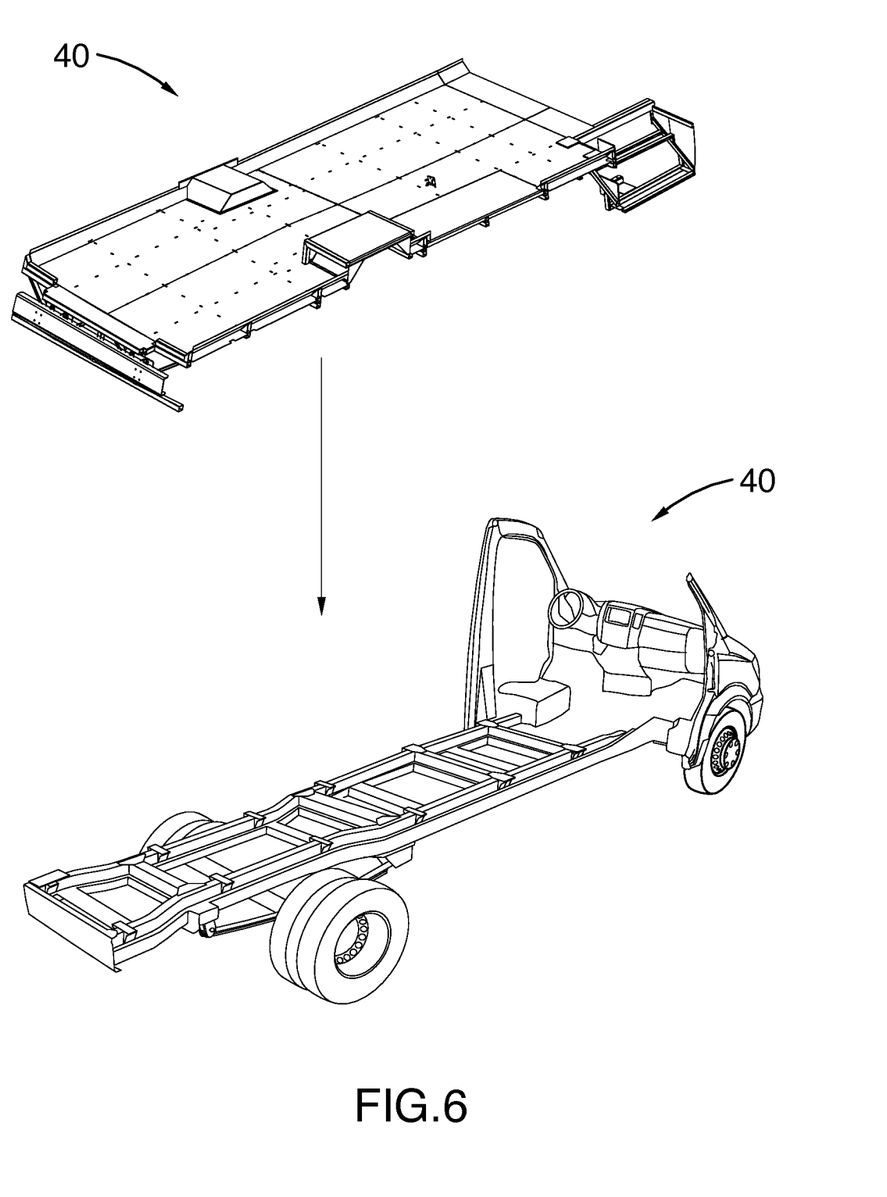
FIG. 6 is a view of the structure of FIG. 3, about to receive a bed.
Figure 7:
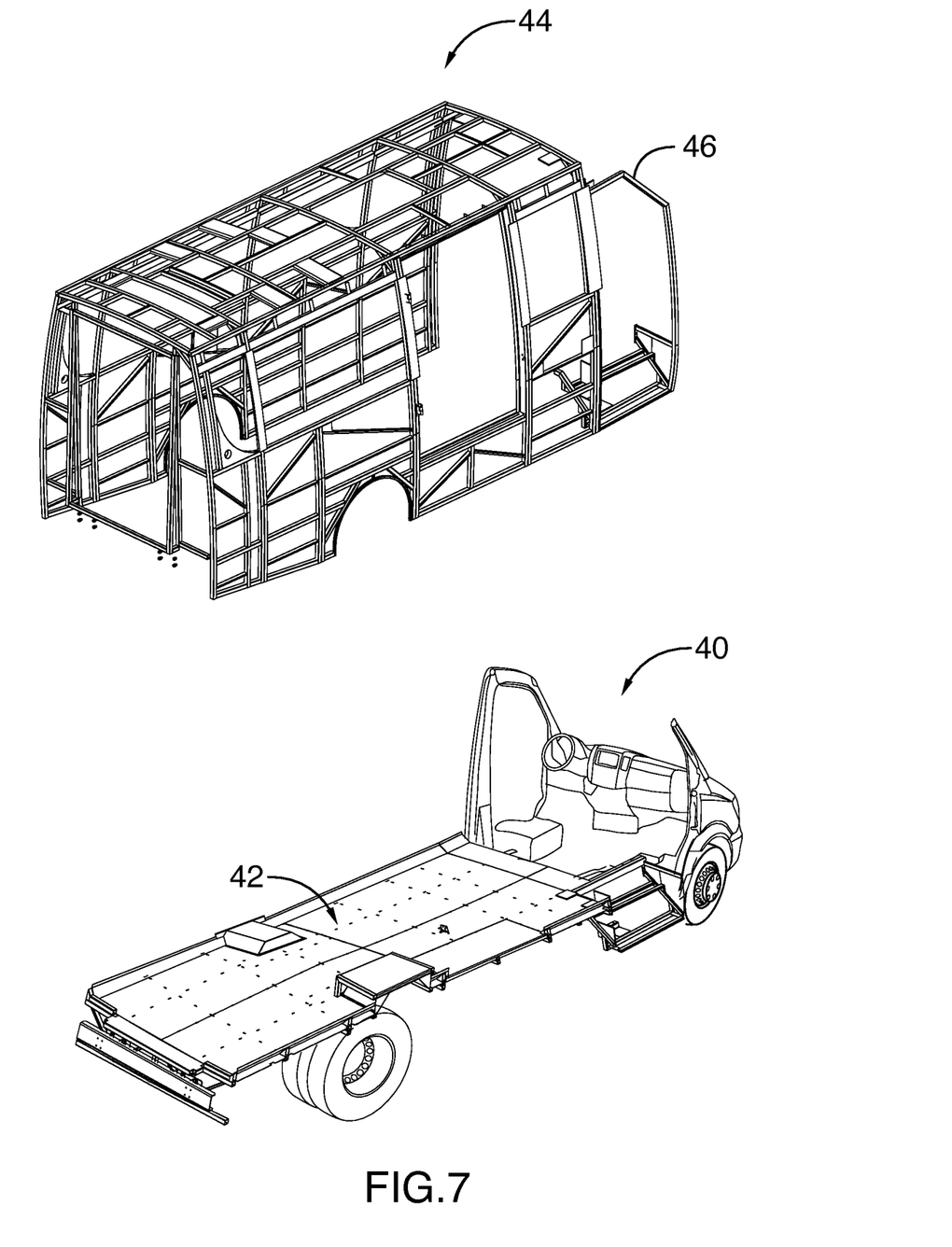
FIG. 7 is a view of the structure of FIG. 6 about to receive a skeletal frame and wherein the structure of FIG. 3 is in receipt of the bed.

In a subsequent step, a bed 42 is mounted to the chassis 40, as shown by the sequence of FIGS. 6, 7.

Figure 8:
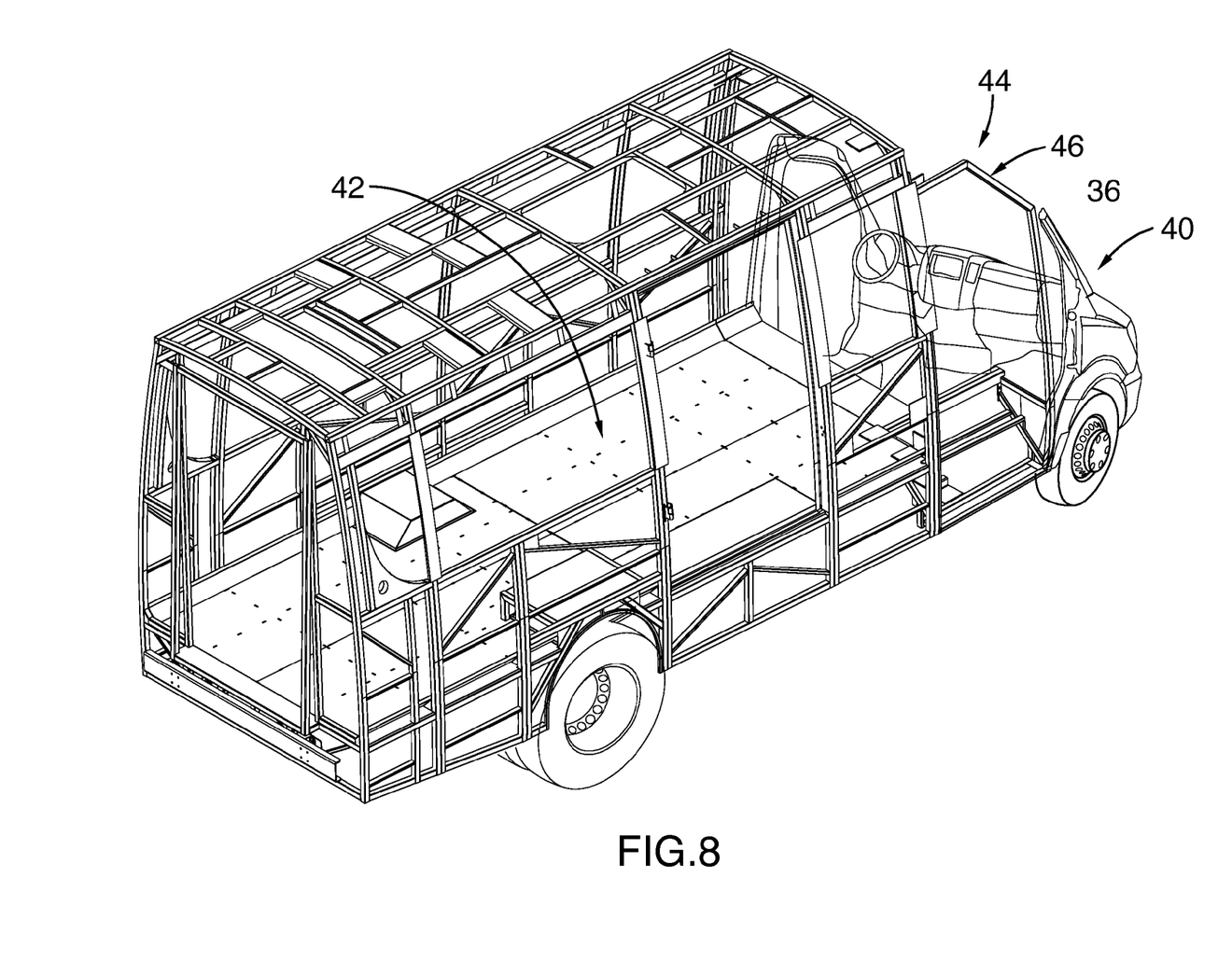
FIG. 8 is a view of the structure of FIG. 7, wherein the structure of FIG. 3 is in receipt of the bed and the bed is in receipt of the frame.

In a yet subsequent step, a skeletal frame 44 is mounted to the bed 42, as shown by the sequence of FIGS. 7, 8. It will be noted in this regard that the frame 44 include a generally horizontal rail 46 which is ultimately welded to the A-pillar 36 as shown in FIGS. 9, 10.

Figure 9:
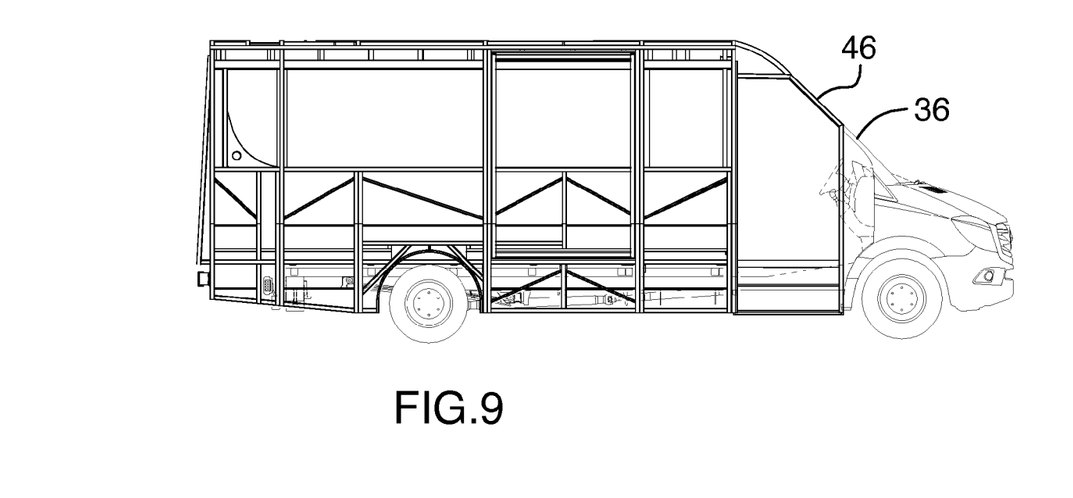
FIG. 9 is a right side view of the structure of FIG. 8, wherein the A-pillar has been welded to the frame.
Figure 10:
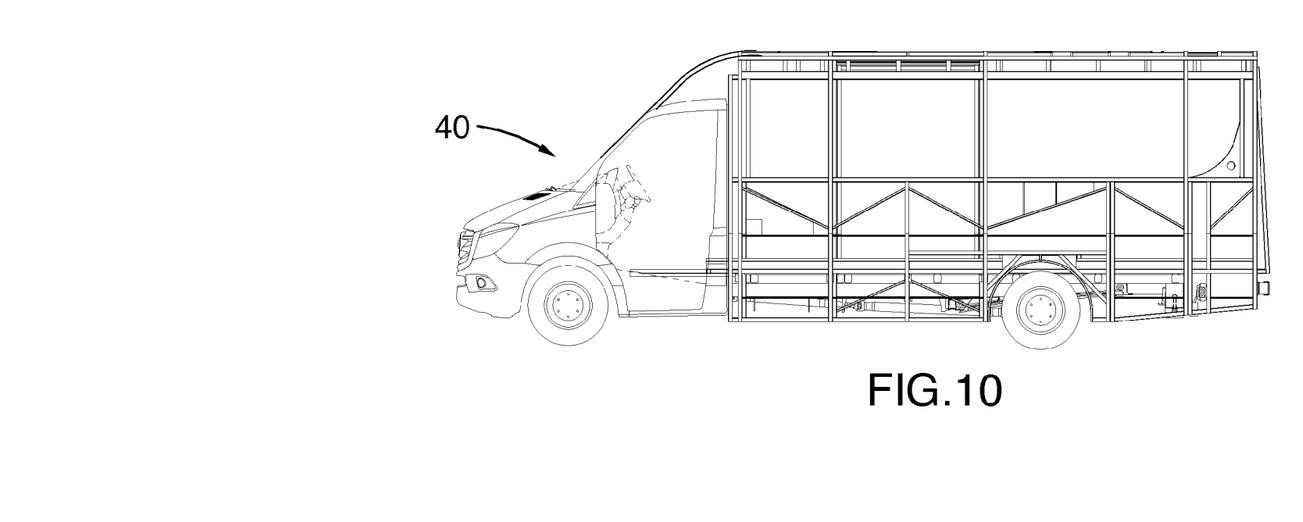
FIG. 10 is a left side view of the structure of FIG. 9.
Figure 11:
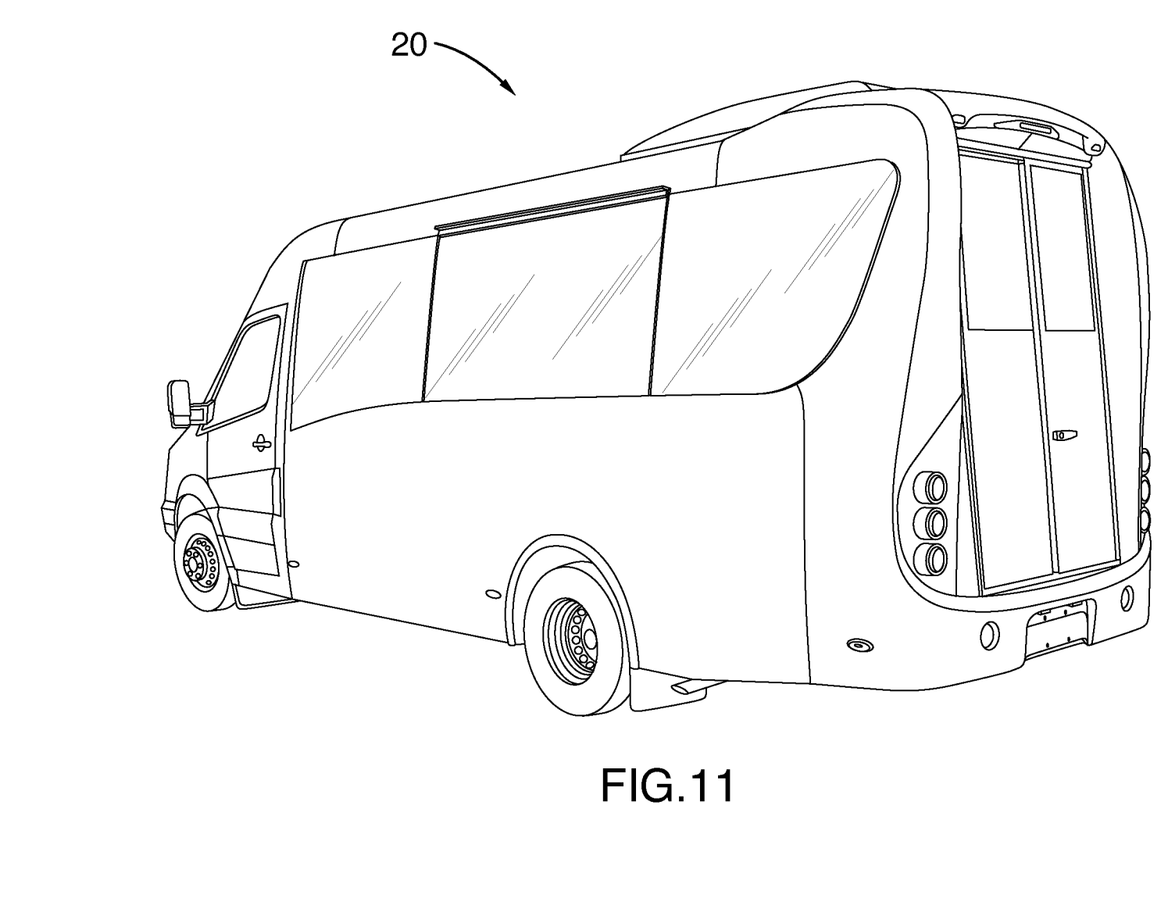
FIG. 11 is a left, rear view of a bus.
Figure 12:
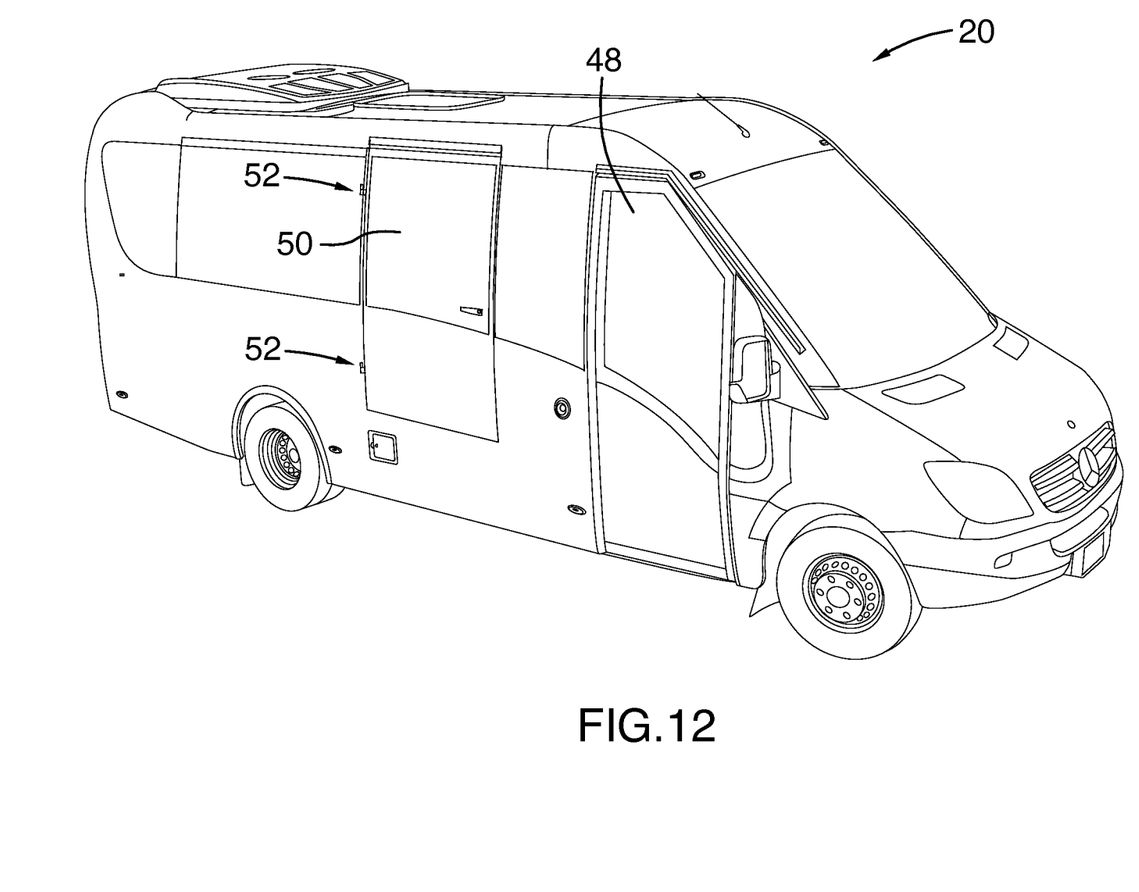
FIG. 12 is a rear, front, top view of the structure of FIG. 11.
Figure 13:
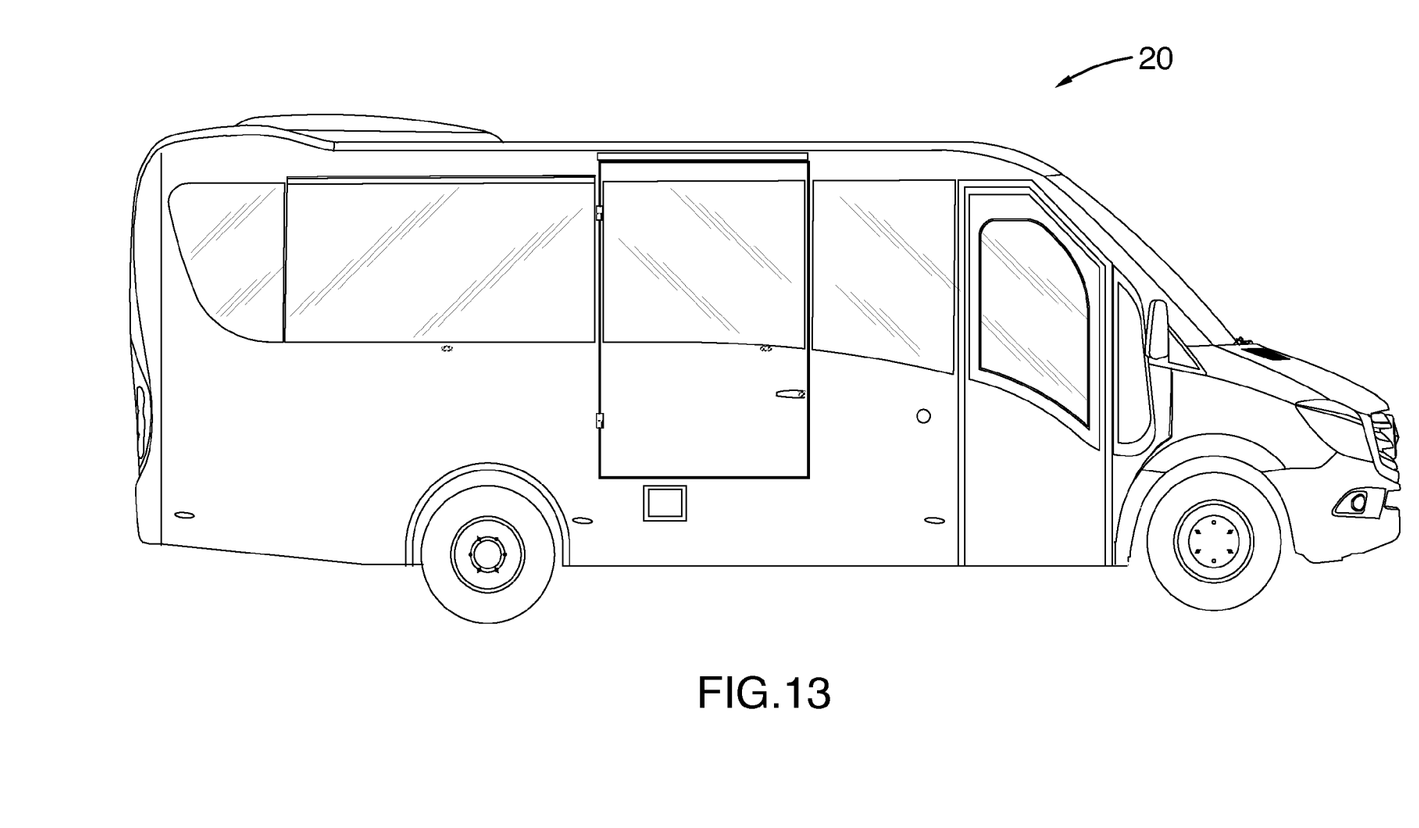
FIG. 13 is a right side view of the structure of FIG. 11.
Figure 14:
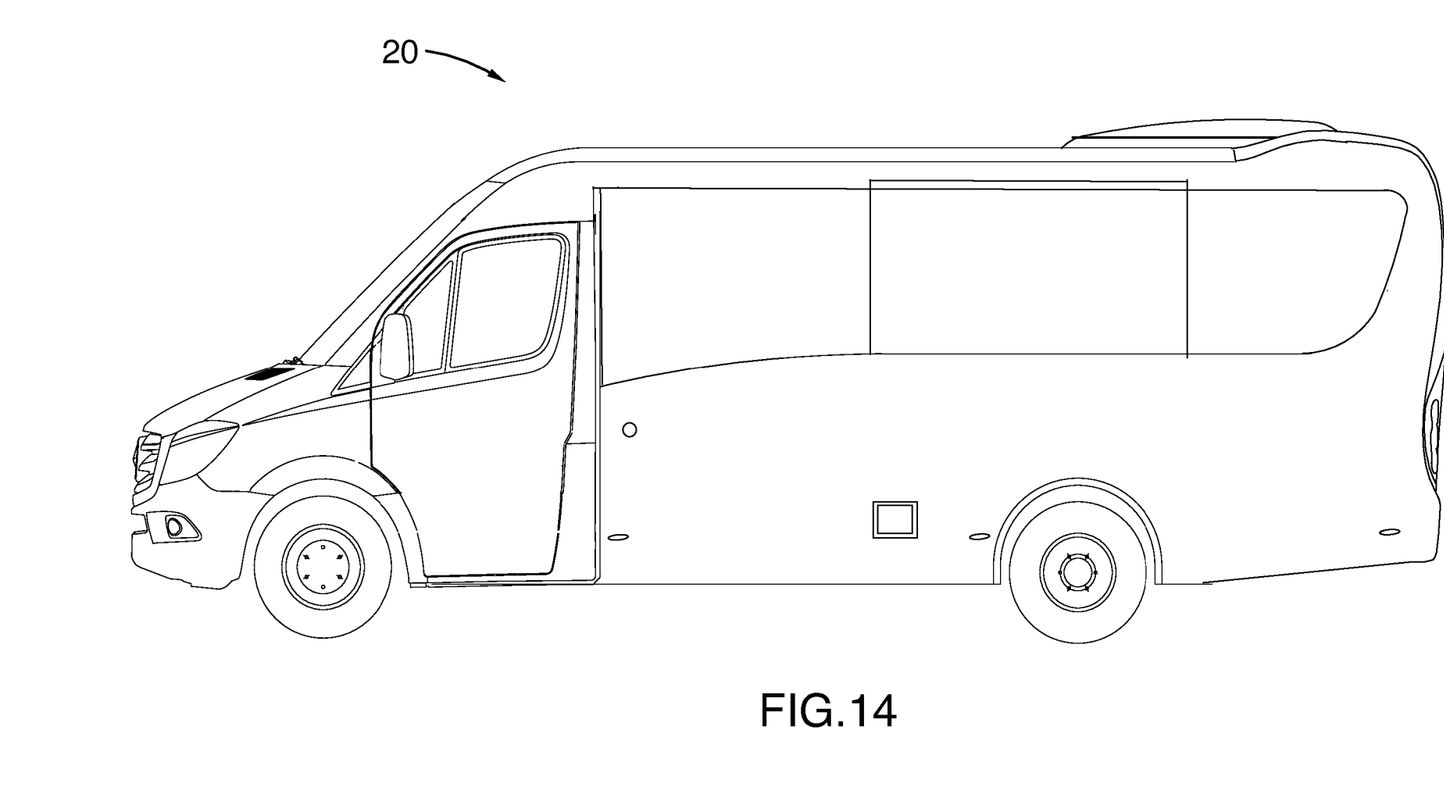
FIG. 14 is a left side view of the structure of FIG. 11.
Figure 15:
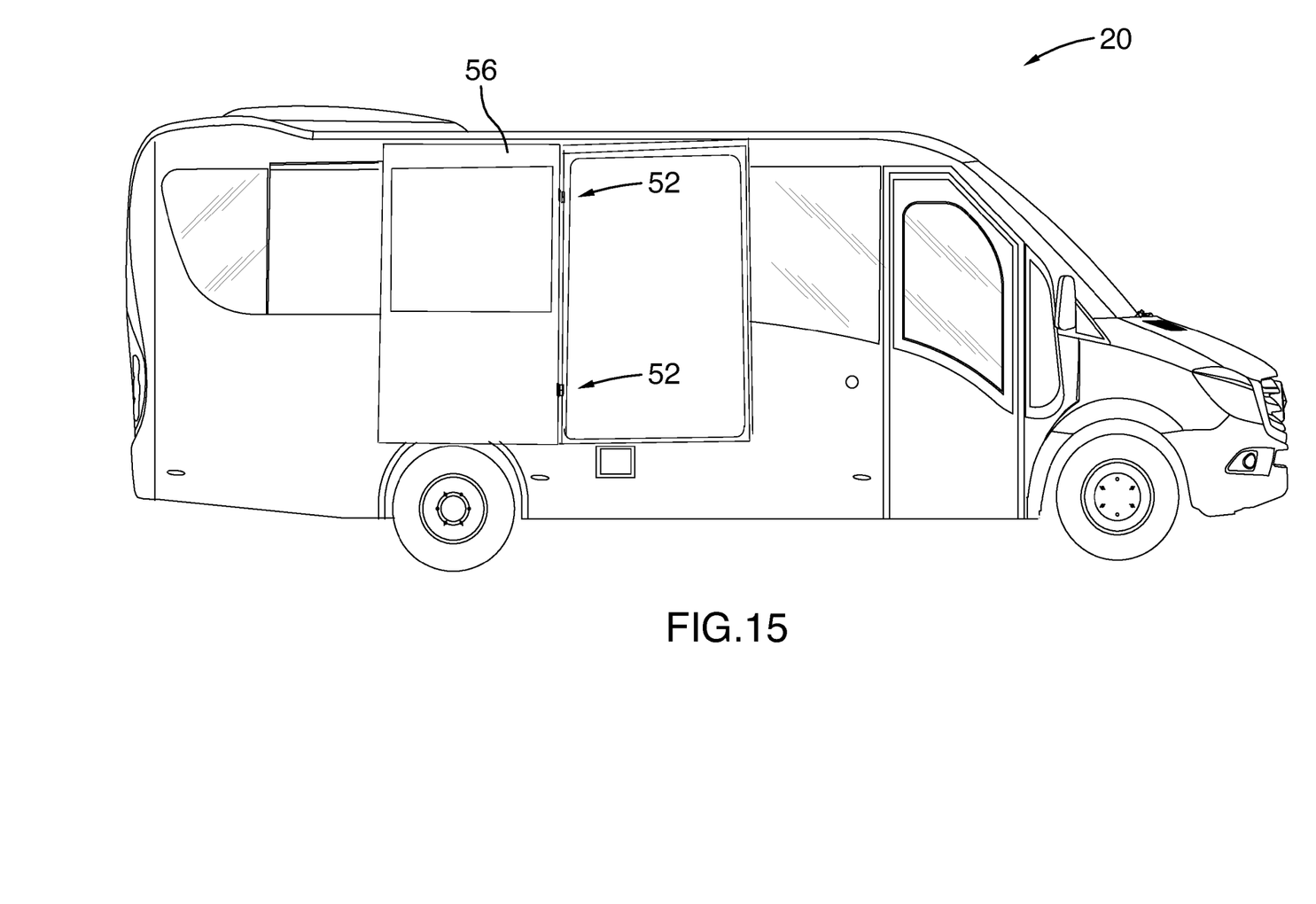
FIG. 15 is a view similar to FIG. 13, wherein the door is in an open position.
Figure 16:
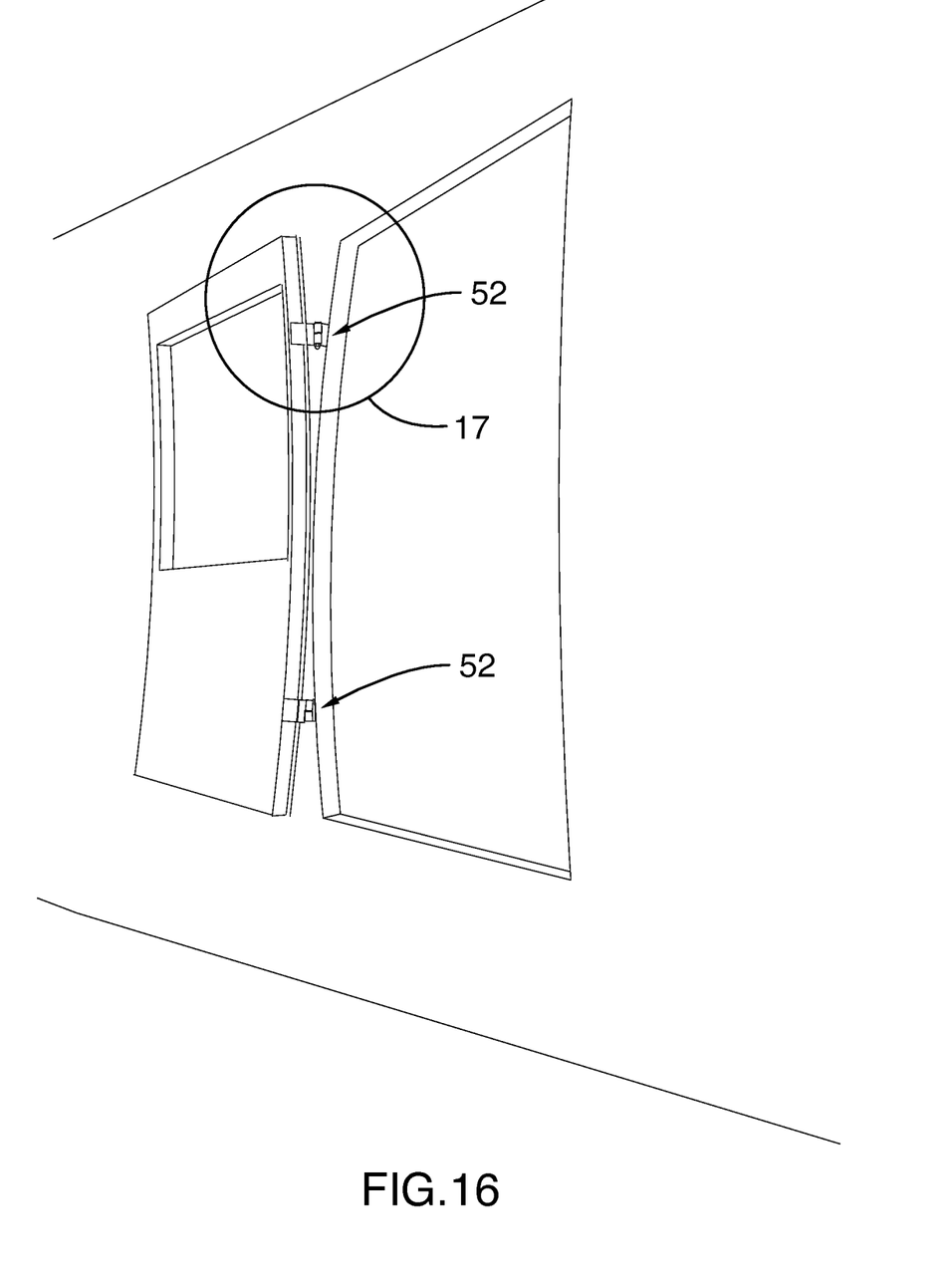
FIG. 16 is a view of the structure of FIG. 15 from a different perspective.
Figure 17:
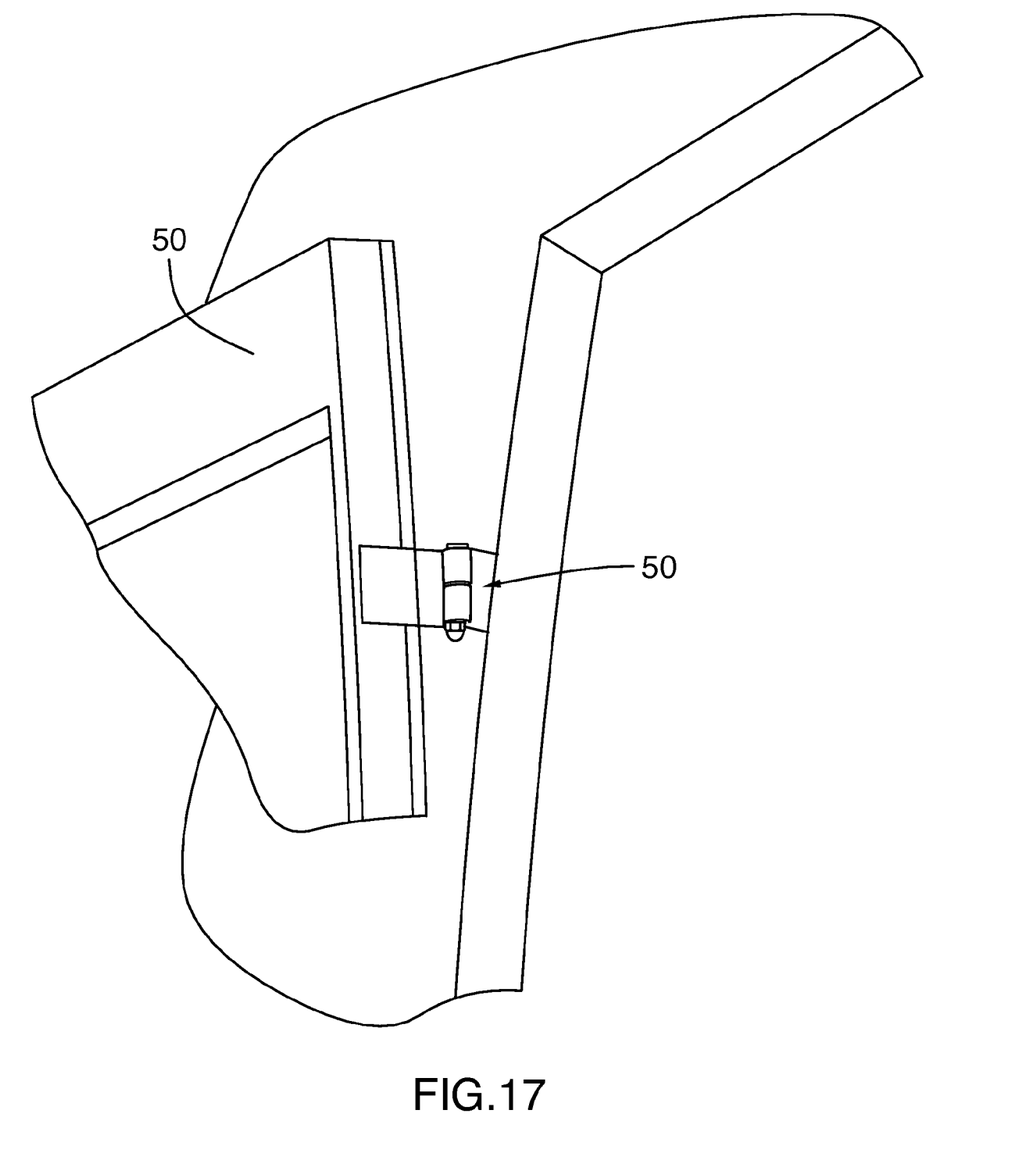
FIG. 17 is an enlarged view of encircled area 17 of FIG. 16.

Thereafter, the remainder of the bus 20 is completed, as shown by the sequence of FIGS. 9, 11. In these regard, the remainder of the bus 20 will be seen to include:
- a sliding passenger door 48; and
- a swinging door 50 disposed on one side of the bus, forward of the rear wheels and rearward of the sliding passenger door 48, the door 50 being adapted to swing, exteriorly of the bus, 180°.

Figures 1, 2:
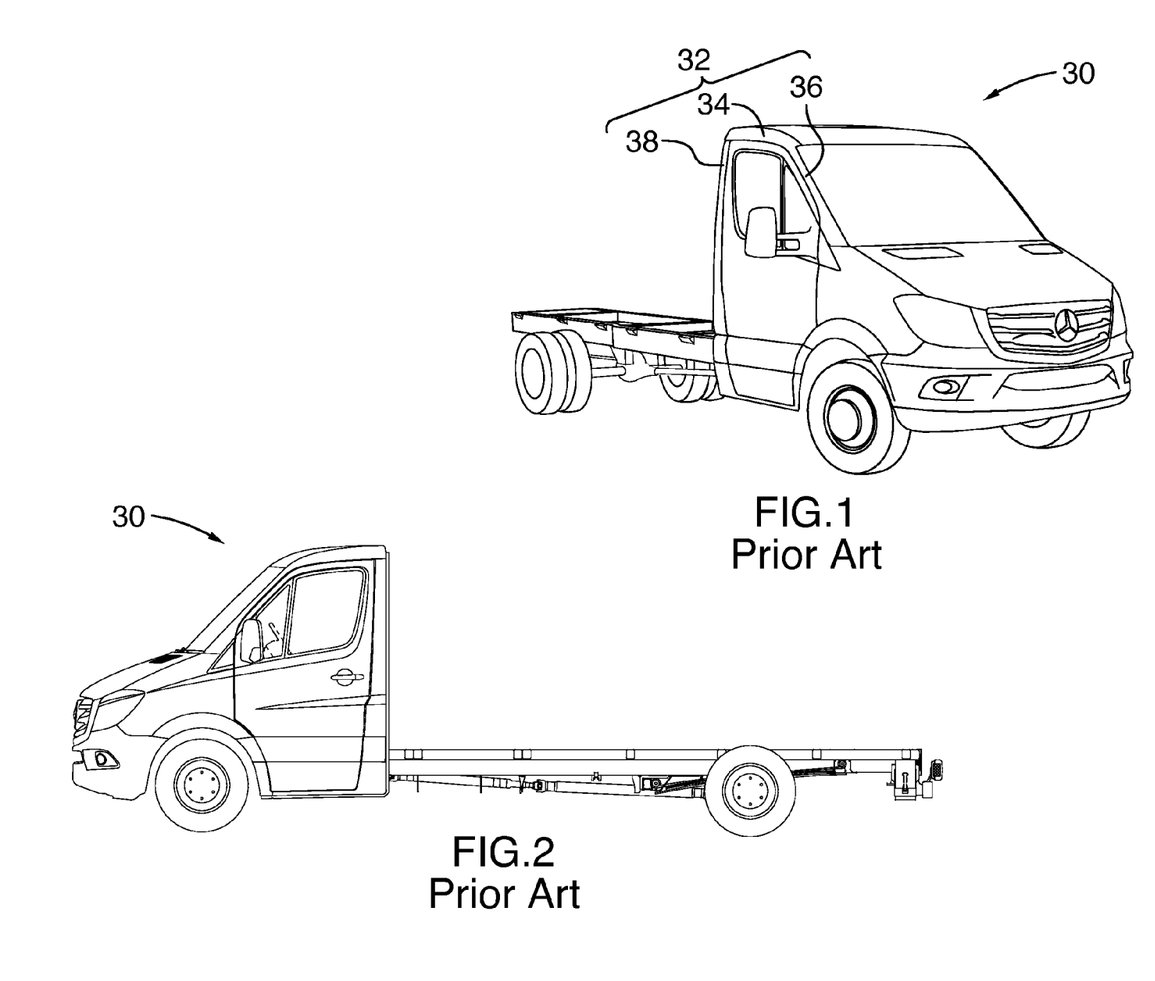
FIG. 1 is a front, right side view of a prior art cutaway van chassis.
FIG. 2 is a left side view of the structure of FIG. 1.

The pivotal movement of the swinging door 50 will be understood to be derived from a pair of hinges 52 which project laterally beyond the exterior wall of the bus, as best seen in FIG. 1.

Whereas a specific embodiment of the invention is herein described, variations are possible. Accordingly, the invention should be understood to be limited only by the accompanying claims, purposively construed.

The invention claimed is:

1. A method for producing a bus using a cutaway van chassis,
   the bus having a sliding passenger door, and
   the chassis having a passenger door frame including a horizontal rail, an A-pillar extending to the rail and a B pillar extending to the rail, the A-pillar being adapted to receive a swinging door,
   the method comprising steps of:
   removing the B-pillar and the rail to produce a modified chassis; and
   constructing a remainder of the bus about the modified chassis;
   wherein the remainder of the bus includes a swinging door disposed on one side of the remainder of the bus, forward of rear wheel of the remainder of the bus and rearward of the sliding passenger door, the swinging door being adapted to swing, exteriorly of the bus, 180 degrees.

2. A method according to claim 1, wherein the remainder of the bus includes a second horizontal rail which is welded to the A-pillar.

3. A method according to claim 2, wherein the remainder of the bus includes a bed which is mounted to the chassis.

\* \* \* \* \*